United States Patent [19]

Hatch

[11] Patent Number: 4,729,299
[45] Date of Patent: Mar. 8, 1988

[54] CITRUS FRUIT PEELING MACHINE

[76] Inventor: Derek H. Hatch, 3939 Viewridge Place, West Vancouver, British Columbia, Canada, V7V 3K7

[21] Appl. No.: 899,607

[22] Filed: Aug. 25, 1986

[51] Int. Cl.⁴ .......................... A23N 4/00; A23N 7/00; B02C 25/00
[52] U.S. Cl. ...................... 99/491; 99/542; 99/546; 99/547; 99/549; 99/591
[58] Field of Search .................. 99/540–546, 99/547–549, 564–566, 584, 550, 588, 589, 590–594, 595, 599, 636, 486, 489–491; 426/482, 481

[56] References Cited

U.S. PATENT DOCUMENTS

| | | | |
|---|---|---|---|
| 1,920,095 | 7/1933 | McCall | 99/542 |
| 2,335,619 | 11/1943 | Thompson | 99/542 |
| 2,447,640 | 8/1948 | Dunn | 99/543 X |
| 3,176,736 | 4/1965 | Belk | 99/538 X |
| 3,246,678 | 4/1966 | Farmer | 99/546 X |
| 3,656,527 | 4/1972 | Vadas et al. | 99/542 |
| 4,213,382 | 7/1980 | Meissner | 99/486 |
| 4,252,056 | 2/1981 | Altman | 99/551 |
| 4,391,185 | 7/1983 | Stanley | 99/489 |

Primary Examiner—Timothy F. Simone
Attorney, Agent, or Firm—Fetherstonhaugh & Co.

[57] ABSTRACT

This invention relates to a method and apparatus of peeling citrus fruit. Citrus fruits are peeled by utilizing a series of cups for holding the fruit such that the core axis of the fruit lies horizontal at right angle to the path of travel. A conveyor is used for advancing the cups in a series of stop/start motions along the path of travel while the fruit is being held in the cups by means of a series of metallic fingers applying downward pressure on the fruit. The blossom and stem of the fruit are sliced to establish parallel planes on the fruit such that the fruit can be guided along parallel plates to prevent movement of the core axis of the fruit. A pair of photo-electric cells will estimate the diameter of the fruit and the information stored for further processing. The fruits are then pierced by means of forks or tines which will rotate them at a constant speed and be carried below a set of rotating cutters. A first rotating cutter will remove the peel, a second rotating cutter will remove the pith and finally a third rotating cutter will remove the membrane of the fruit. The core of the fruit will finally be removed from the fruit and finally ejected to be further processed.

17 Claims, 5 Drawing Figures

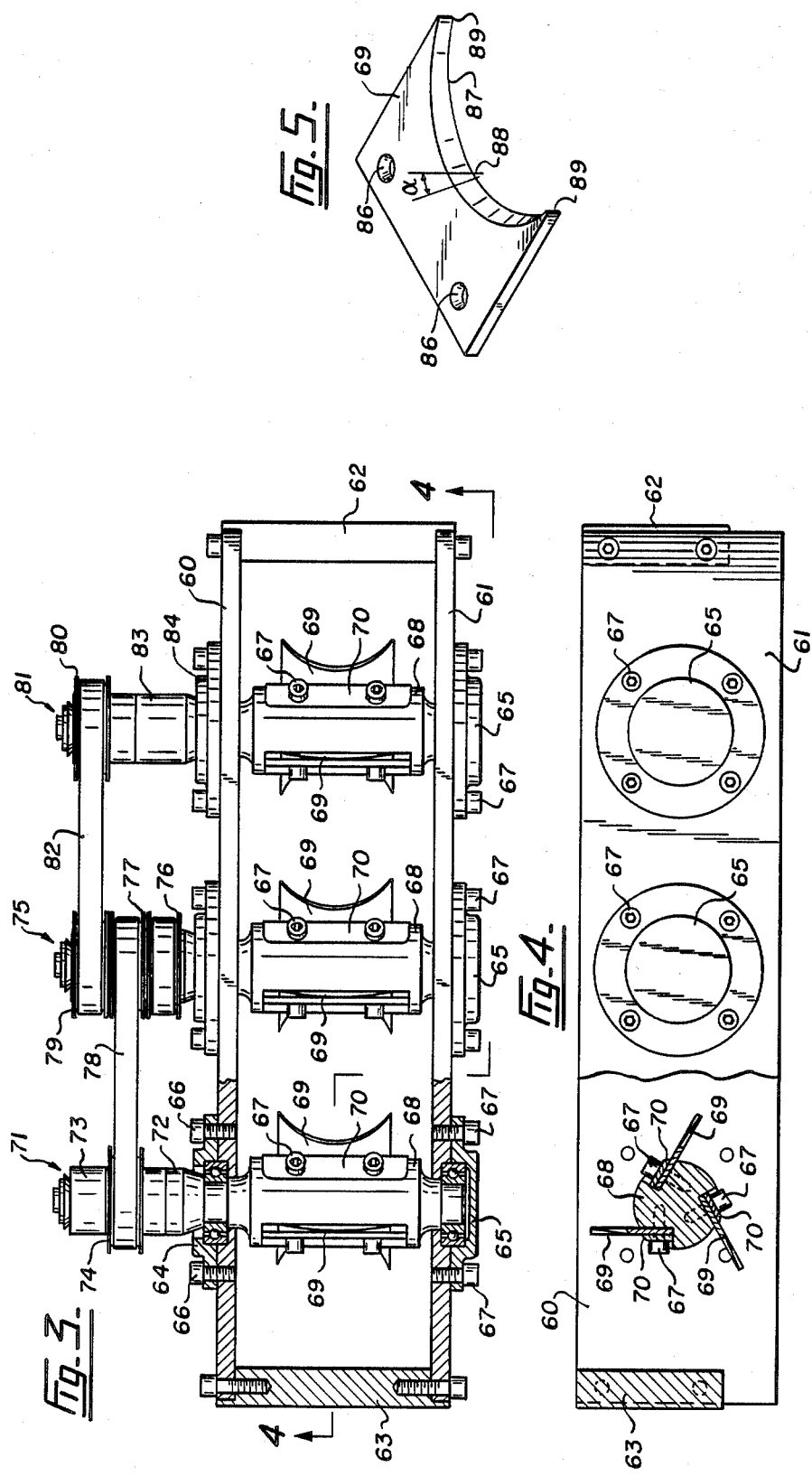

CITRUS FRUIT PEELING MACHINE

FIELD OF THE INVENTION

This invention relates to peeling machines and more particularly to machines for peeling citrus fruit.

DESCRIPTION OF THE PRIOR ART

Until recently, the only successful way of peeling and preparing citrus and other fruits for incorporation into fresh fruit salads, has been entirely done manually. Increased production however requires the use of mechanical equipment which would successfully peel citrus fruit and sectionize them. A machine that would successfully remove the outer skin, pith and membrane of citrus fruit at high speed has so far been unavailable.

A number of fruit peeling apparatus have been disclosed in prior art systems. For example, U.S. Pat. No. 3,656,527 which issued to Vadas discloses a fruit peeling apparatus which is comprised of a cross conveyor for simultaneously advancing a line of spaced fruit. A number of feed conveyors running laterally from the cross conveyor and an apparatus for transferring fruit from the cross conveyor to the feed conveyor was also included. A peeling turret for each feed conveyor, a contour peeling head for each peeling turret, a core turret between each feed conveyor and the associated peeling thread and having one coring tube is provided. In this invention, a continuous supply of unpeeled, unprocessed pineapples in a single-file row is supplied at relatively high speeds and peeled.

U.S. Pat. No. 1,920,095 which issued to McCall discloses a fruit treating apparatus for removing the peel and core articles of citrus fruit without the use of manual labour. The fruit peeling machine comprises a chuck adapted to grip the fruit incident to its peeling, where the fruit is advanced to a peeling station by conveyor whereby the chuck will come to rest momentarily at the peeling station. A cylindrical cutting knife at the peeling station passes into the chuck and through the fruit to remove a band of peel from the fruit. The fruit is then released and cut subsequently to sever the unpeeled ends of the fruit.

U.S. Pat. No. 2,335,619 which issued to Thompson discloses a machine for preparing pears for canning. The pear preparation machine has a reciprocatory peeling mechanism and the pear is held with its stem axis parallel to the path of reciprocation. The peeling mechanism includes a pivotally mounted knife assembly which is resiliently urged toward the pear during the peeling stroke of the mechanism. The knife assembly includes a peeling blade and a gauge adapted to contact the pear surface. The weight of the knife assembly being on balance on its pivot so that the blade is automatically positioned to engage a pear before the gauge at the beginning of the peeling stroke of the peeling mechanism.

U.S. Pat. No. 2,034,160 to Taylor discloses a machine which will automatically prepare pineapples for canning. In the machine described an annular series of radial blades are arranged to leave a cylindrical passage between the blades, pineapples are conveyed through this passage whereby the pineapple is formed with a series of radial slits extending from the periphery of a cylindrical section wherein the blades separate an adjacent portion of the shell of the pineapple from its meat and leave the meat from the periphery of the cylindrical section.

U.S. Pat. No. 3,176,736 which issued to Belk discloses an apparatus for sectionizing citrus fruit wherein a peeled citrus fruit is fixedly positioned with its blossom and upper most end at a predetermined elevation with an abrading member positioned above the fruit to contact the blossom end of the fruit and remove it.

U.S. Pat. No. 4,252,056 to Altman discloses an automatic fruit processing apparatus mechanism adapted for fruit coring and core removal with fruit advancing apparatus.

U.S. Pat. No. 2,447,640 which issued to Dunn discloses a method and apparatus for orienting, peeling, halving and coring pears.

U.S. Pat. No. 2,740,441 to Coons discloses a fruit preparation machine for peeling, coring, trimming and halving pears or other fruit to prepare them for packing and further processing.

Finally, U.S. Pat. No. 3,246,678 which issued to Farmer discloses a pineapple processing system wherein the pineapples are sliced, cored, trimmed and loaded.

None of the aforementioned machines are able to remove the peel, pith, membrane and core the fruit with no more than 10% wastage of the flesh of the fruit. Also, none are readily adaptable from grapefruit to orange and to the various sizes of citrus fruits to be processed.

Other concepts have been used to make peeling of citrus fruit possible. For example, a process can be used in which the fruit is pre-steamed, cored, the skin cored segmentally and removed in segments. The membrane is then removed by immersion in a caustic soda bath.

Another concept of a fruit peeling machine is the removal of the peel using profiled stationery knives. The fruit is pre-steamed as in previous method, the fruit is then centered and held by forks while moving through the machine. A "V" is cut in the top of the fruit with one leg vertical and one leg horizontal with the membrane pierced. The fruit moves forward and starts to rotate when it arrives at a series of contoured inclined knives which removes the peel as the fruit advances and rotates. Removal of the core then follows.

The method described in the first concept has been on the market for several years. However, machines are no longer manufactured since the maintenance of this equipment was extremely high and costly and therefore fruit can be peeled almost as economically by hand. The machine still required to have operators behind it, who were kept busy removing piths that had been missed by the machine even though the fruit had been presteamed to render the skin and pith more easily removable. However, the membrane is not removed by the machine i.e. the fruit must be immersed in a 2 to 3% solution of caustic soda at a temperature of 170° F. for from 30 to 40 seconds.

On the other hand, concept No. 2 requires the accurate centering of each fruit on the forks which hold and rotate then. If the fruit is not properly centered on these forks, the fruit is liable to end up with one half of the fruit peeled and the other not peeled or only partially peeled. Another potential problem is the fruit's tendency to disintegrate under the torque applied by the forks during the action of the cutters, with the additional hazard of not knowing whether the flesh of the fruit is capable of resisting the torque applied to it during the paring operations. The load applied by the forks would be decidedly greater than the load applied in the case where as the cutters rather than rotating at a high speed and removing minute shavings of peel will be attempting to remove the peel in a continuous paring. Another problem with this concept is that the machine would not completely remove the pith or the membrane and it would be necessary to process the fruit in a caustic bath.

SUMMARY OF THE INVENTION

It is therefore an object of the present invention to provide a citrus fruit peeling machine able to remove the peel, pith and membrane of the fruit with no more than 10% wastage of the flesh of the fruit.

Another object of the present invention is to provide a citrus fruit peeling machine able to remove the core of the fruit.

Yet another object of the present invention is to provide a citrus fruit peeling machine which is readily adaptable to peel citrus fruit from grapefruit to orange and to the various sizes of citrus fruit that are required to be processed.

In yet another object of the present invention is to provide a citrus fruit peeling machine which will decrease the number of required operators.

According to an aspect of the present invention there is provided a method of removing the peel, pith and membrane of a citrus fruit having two ends and a core axis comprising the steps of: placing said fruit onto cup means such that the core axis of said fruit lies horizontal and at right angle to the path of travel; advancing said cup means in a series of stop/start motions by conveyor means; holding said fruit in said cup means by retaining means so as to apply downward pressure to hold said fruit in said cup means; slicing the ends of the fruit to establish parallel planes on said fruit; guiding said fruit between vertical plate means parallel to said conveyor means thereby preventing movement of the core axis of said fruit; measuring said fruit in said cup means to estimate the diameter of said fruit; storing by storing means the diameter of said fruit; adjusting, according to said stored diameter, means for carrying and rotating said fruit so as to allow said means to be positioned along said core axis, said means allowing said fruit to be rotated about said core axis while being carried along said conveyor means along said path of travel; removing said peel, pith and membrane of said fruit by rotating cutter means; removing said core by coring means; and withdrawing said carrying and rotating means from said fruit to allow said fruit to be removed.

According to another aspect of the present invention there is provided an apparatus for removing the peel, pith and membrane of citrus fruit having two ends and a core axis comprising: cup means for holding said fruit such that the core axis of said fruit lies horizontal and at right angle to the path of travel; conveyor means for advancing said cup means in a series of stop/start motions along the path of travel; retaining means for holding said fruit in said cup means so as to apply downward pressure to hold said fruit in said cup means; slicing means for slicing the ends off said fruit to establish parallel planes on said fruit; plate means parallel to said conveyor means for guiding said fruit and thereby prevent movement of the core axis of said fruit; measuring means to estimate the diameter of said fruit; storing means to store the diameter of said fruit; means for carrying and rotating said fruit, adjustable according to said stored diameter, so as to allow said means to be positioned along said core axis, said means allowing said fruit to be rotated about said core axis while being carried along said conveyor means; rotating cutter means for removing said peel, pith and membrane of said fruit; coring means for removing said core of said fruit; and ejecting means for removing said fruit from said carrying and rotating means.

DRAWINGS

Particular embodiments of the invention will be understood in conjunction with the accompanying drawings in which:

FIG. 3 is a partially sectioned top view of the high speed cutters used in the present invention;

FIG. 4 is a partially sectioned side view shown along lines 4—4 of FIG. 3; and

FIG. 5 is an isometric view of the cutting blade used with the high speed cutters shown in FIGS. 3 and 4.

DESCRIPTION OF THE PREFERRED EMBODIMENTS

Figure 1:
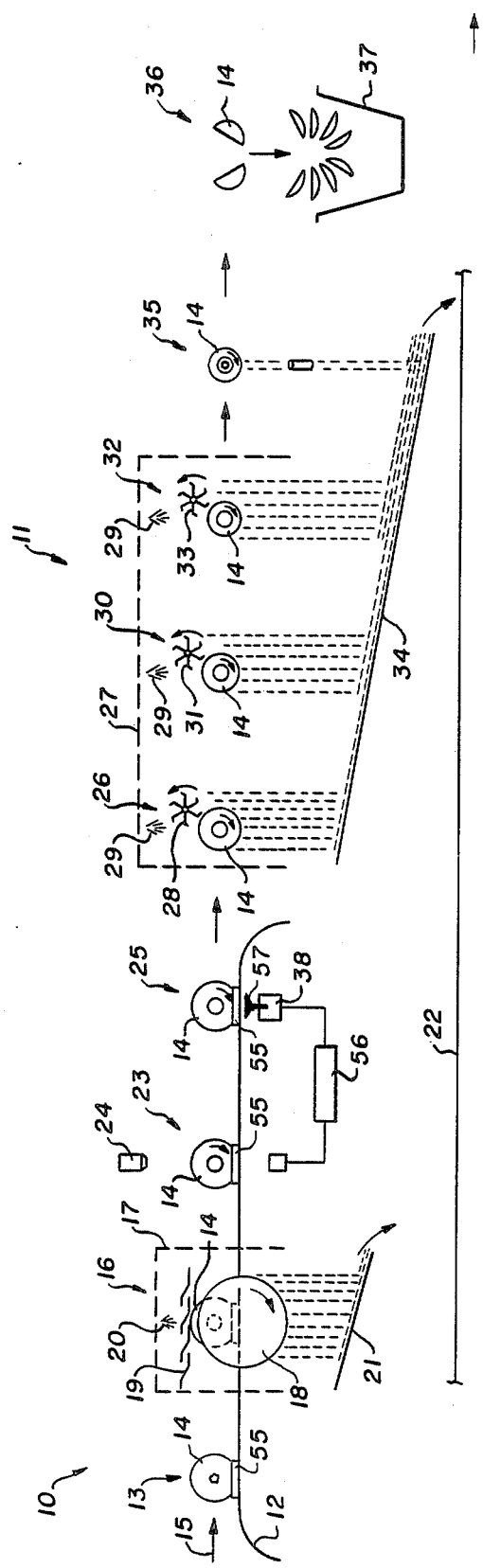
FIG. 1 is a schematic and graphical illustration of the proposed machine layout of the present invention.

FIG. 1 illustrates the two major assemblies that form part of the citrus fruit peeling machine of the present invention. The first is the infeed assembly 10 and the second is the processing assembly 11. The infeed assembly 10 comprises an endless chain 12 upon which are mounted at specified intervals circular cups 55 which advance into the body of the machine in a series of stop/start motions. These cups are more clearly shown in FIG. 2. Infeed assembly 10 is sub-divided into four stations. The first being the loading station 13 where the operator places each fruit 14 onto a cup 55 with the core of the fruit horizontal and at right angles to the path of travel as depicted by arrow 15.

The second station is the end slicer station 16 covered by enclosure 17 and includes two fixed circular slicing saws 18 a series of spring steel fingers 19 to hold the fruit against its cup while the blossom and stem end of each fruit is being sliced off by the slicing saws 18.

A water spray 20 continuously feeds fresh water over the fruit as it is being processed such that waste products can be discarded over a waste chute 21 which further discharges onto a conveyor 22 which leads to a scrap bin not shown. The third station is the diameter sizing station 23 which basically consists of a photo electric cell 24 mounted above and below the cup supported fruit while the diameter is taken from the outer skin of the fruit as it passes between the photo electric cells. The length of time the light of the photocell becomes interrupted provides an indication of the fruit's diameter. The information can then be stored in a programmable controller 56 for the next operation.

Figure 2:
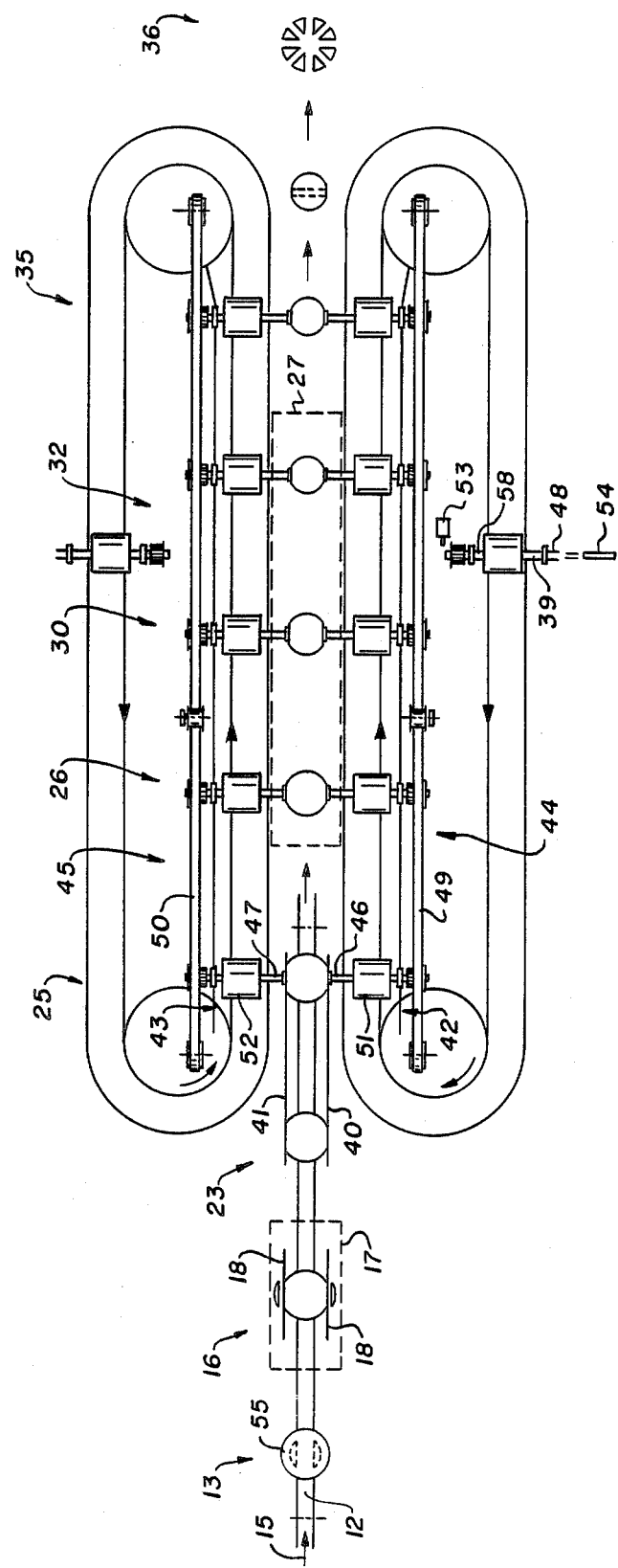
FIG. 2 is a top view of the proposed machine layout of the present invention.

At station 25 the infeed conveyor 12 is joined by two tracks more clearly shown in FIG. 2 which are parallel to the path of the feed conveyor and set at a fixed distance from it. At this station, a stepping motor 38 is used to raise the first fruit supported in a cup such that the horizontal centreline of the fruit is aligned according to the stored diameter with the fruit carrying and rotating forks 46 and 47. The fruit then enters a 5th station 26 under an enclosure 27 and the fruit is passed below the first high speed cutter 28 which will remove the peel from the fruit while being continuously sprayed with water by a number of water sprays 29 located throughout enclosure 27.

At the sixth processing station 30 the fruit is passed under a second high speed cutter 31 which will remove the pith still covering the citrus fruit. At the 7th station 32 yet another high speed cutter 33 will remove the membrane off the citrus fruit to complete the basic peeling process. Waste materials washed down by water sprays 29 are collected down an inclined chute 34 and emptied onto a conveyor 22 discharging the waste to a scrap bin.

Stations 35 and 36 can be optional processes which may be carried out further on the citrus fruit once the peeling process has been completed. At station 35 the core of the fruit can be removed in a coring process and discharged on waste chute 34. At station 36 the fruit can be segmented into a number of sections discharged into a shipping container 37 and put into storage until eventually sold.

FIG. 2 is a top view of the citrus fruit peeler of the present invention. Again stations 1 through to 9 are depicted by reference numerals 13, 16, 23, 25, 26, 30, 32, 35 and 36 respectively. As more clearly shown in FIG. 2, at station 16 and 23, following the removal of the ends, the fruit passes between two vertical plates 40 and 41 which are parallel to the conveyor. These plates act as guides to prevent the location of the core of the fruit from moving relative to the position of the cup 55. As indicated previously, once the diameter of the fruit has been measured at station 23, the infeed conveyor is joined by two nylon U-shaped tracks 42 and 43 which are parallel to the path of the infeed conveyor and set at a distance from it. Along tracks 42 and 43 are a series of two carriages 44 and 45 which are mounted exactly opposite each other and move in synchronism with the infeed conveyor, stopping momentarily at each of the stations. At station 25 while the cup is stopped, a pair of tines or forks 46 and 47 and more clearly depicted at 48 will be inserted into the fruit after the fruit has been raised to a point where the cone axis of the fruit becomes coincident with the center line of the fruit. The fruit is raised by means of a stepping motor 38 and a piston assembly 57 which is controlled from the information derived at the diameter sizing station 23. At this location the fruit will be centered on the forks or tines. As the fruit which is now supported on the forks or tines mounted on the two parallel side carriages 44 and 45 advances, it will be rotated by gearbelt 49 and 50 which runs parallel to the path of the carriages. At this point the fruit will revolve at approximately two revolutions per second.

Once the rotating fruit enters enclosure 29 it will stop directly beneath the first of a series of high speed cutters. These are positioned along an incline plane sloping downwardly along the path of travel. At station 26, the high speed cutter will remove approximately 1 mm of thickness of the peel of the rotating fruit. At stations 30 and 32 the peel is removed progressively until the membrane is stripped off on the last station and the fruit emerges still rotating. At station 35 the core of the fruit is removed by piercing the fruit as it is being held by the forks 48. The corer is positioned within the fork's supporting arm 39 and basically consist of a hollow spring loaded tub 58 with a knife edge which is activated by pneumatic cylinders 51 and 52. The core of the fruit is stored in tube 58 until it is ejected by an air jet 53 after the fruit has been removed as shown at 54. The tines or forks are removed and the fruit will descend down an inclined chute to the segmenting station 36.

The progressive movement of the carriages carrying the fruit through the various steps is accomplished by means of a crank and slotted lever and a ratchet mechanism which is connected to the horizontal and vertical conveyors. This enables the precision movement to be maintained constantly. The fixing of the fruit upon the forks or tines is also accomplished by means of fixed pneumatic cylinders 51 and 52, the piston rods of which extend and push the shafts carrying the tines or forks into the fruit. Alternatively, electrical solenoids could be used. When the operations have been completed, the tines or forks are removed from the fruit mechanically by cam device which is guided in a nylon U-shaped track 42 and 43 which runs between the two parallel carriages. These conveyor mechanisms are well known in this art and need not be discussed further.

FIG. 3 depicts the high speed cutter assembly. The high speed cutters are mounted onto a pair of side plates 60 and 61 which are separated by end plates 62 and 63. Each high speed cutter is secured to side plates 60 and 61 by means of a drive end bearing retainer 64 secured to side plate 60 and idler end bearing retainer 65 secured to side plate 61 by means of a set of socket head cap screws 66 and 67. Each high speed cutter is comprised of a cutting blade spindle 68 and three cutting blades 69 secured to spindle 68 by means of blade backup plates 70. All of which are secured together by means of standard socket head cap screws 67. High speed cutter 71 is provided with a spacer 72 and 73 between which is positioned a gear belt pulley 74. High speed cutter 75 includes three gear belt pulleys in which gear belt pulley 76 can be attached to a motor by means of a belt (not shown). Gearbelt pulley 77 is attached to gearbelt pulley 74 of high speed cutter 71 by means of gearbelt 78. Gear belt pulley 79 of high speed cutter 75 is attached to gear belt pulley 80 of high speed cutter 81 by means of a second gearbelt 82. A spacer 83 separates the gearbelt pulley 80 from the drive end bearing retainer 84.

Referring now to FIG. 5 we have shown an isometric view of a cutting blade used on each high speed cutter. Blade 85 can be made of material such as stainless steel and is provided with holes 86 by which blade 85 is secured to the spindle of each high speed cutter. The cutting edge of the blade 87 is tapered such that the angle alpha that the cutting edge makes with a vertical axis will vary from 35° at the centre 88 of the cutting edge to reduce gradually to 0° at the outer edge 89 of the cutting blade.

As will be apparent to those skilled in the art in light of the foregoing disclosure, many alterations and modifications are possible in the practise of this invention without departing from the spirit or scope thereof. Accordingly, the scope of the invention is to be construed in accordance with the substance defined by the following claims.

I claim:

1. An apparatus for removing the peel, pith and membrane of citrus fruits while said fruit is travelling along the longitudinal axis of said apparatus, said fruit having two ends and a core axis, comprising:

cup means for holding said fruit such that the core axis of said fruit lies horizontal and at right angle to the longitudinal axis of said apparatus;

conveyor means for advancing said cup means along the longitudinal axis of said apparatus in a series of stop/start motions;

slicing means for slicing the ends off said fruit to establishing parallel planes on said fruit;

a pair of vertical plates positioned on each side and parallel to said conveyor means for guiding said fruit there between thereby preventing movement of a core axis of said fruit;

sensing means for providing a signal indicative of the diameter of said fruit;

storing means to store the diameter of said fruit;

means for carrying and rotating said fruit, said means allowing said fruit to be rotated about said core axis while being carried along said conveyor means;

means for adjusting the height of said fruit according to the stored diameter of said fruit such that said core axis is aligned with said carrying and rotating means;

rotating cutter means positioned along said path of travel for removing said peel, pith and membrane of said fruit.

2. An apparatus as defined in claim 1 further comprising retaining means for holding said fruit in said cup means so as to apply downward pressure to hold said fruit in said cup means.

3. An apparatus as defined in claim 2 wherein said retaining means comprises a series of spring steel fingers for holding said fruit in said cup means.

4. An apparatus as defined in claim 1 wherein said adjusting means comprises a stepping motor adapted to adjust the height of said fruit by means of a piston assembly located beneath said fruit.

5. An apparatus as defined in claim 1 further comprising coring means for removing the core of said fruit, said coring means being incorporated within said carrying and rotating means and actuated by a pneumatic cylinder.

6. An apparatus as defined in claim 5 wherein said coring means comprises a cylindrical tube with a knife edge.

7. An apparatus as defined in claim 1 wherein said core is ejected from said coring means by a high velocity jet of compressed air.

8. An apparatus as defined in claim 1 wherein said cup means comprises a series of circular cups mounted at specified intervals along said conveyor means.

9. An apparatus as defined in claim 1 wherein said slicing means comprises a pair of fixed circular slicing saws positioned on each side of said conveyor means.

10. An apparatus as defined in claim 1 wherein said measuring means comprises a set of photoelectric cells mounted above and below said cup means.

11. An apparatus as defined in claim 1 wherein said storing means is provided in a programmable controller.

12. An apparatus as defined in claim 1 wherein said carrying and rotating means comprises a series of forks affixed to the fruit by means of piston rods activated by pneumatic cylinders.

13. An apparatus as defined in claim 1 wherein said carrying and rotating means is comprised of a series of forks affixed to the fruit by means of armaturres of electrical solenoids.

14. An apparatus as defined in claim 1 wherein said rotating cutter means comprises a first set of cutting means for removing said peel, a second set of cutting means for removing said pith and a third set of cutting means for removing said membrane of said fruit.

15. An apparatus as defined in claim 14 wherein said cutting means comprises a cutting blade spindle on which is secured three cutting blades.

16. An apparatus as defined in claim 15 wherein said cutting blade include a tapered semicircular cutting edge.

17. An apparatus as defined in claim 16 wherein said tapered cutting edge has a cutting angle which varies from 35° at the center of the cutting edge to 0° at the outer edge of the cutting blade.

* * * * *